(No Model.)
H. J. CAMPBELL.
WINE AND CIDER PRESS.
No. 261,807. Patented July 25, 1882.
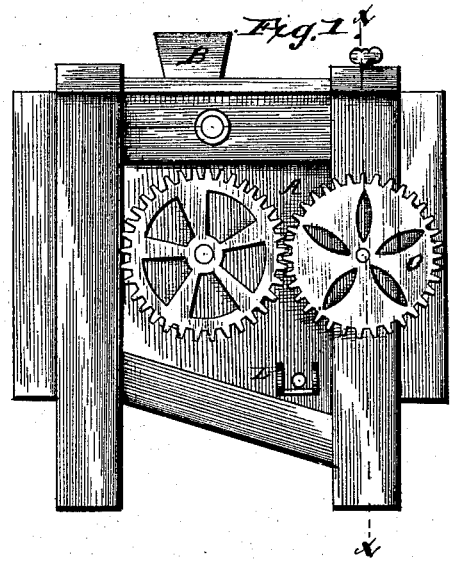
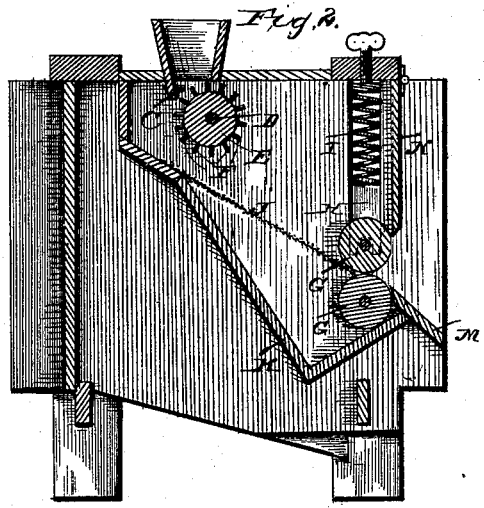
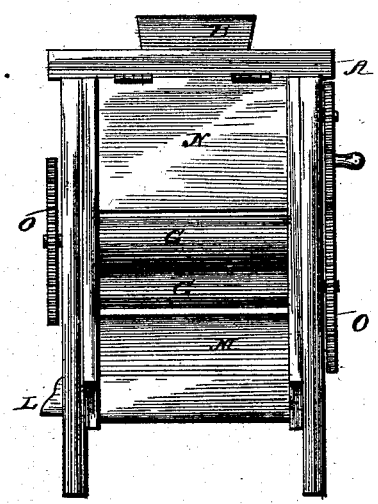
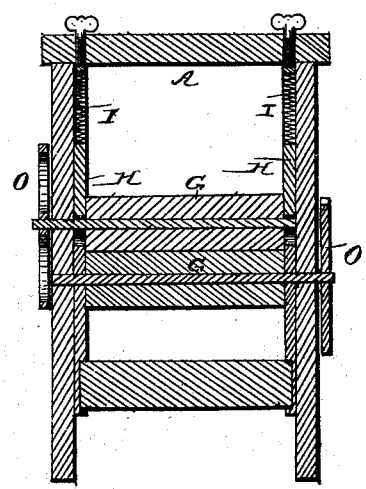
WITNESSES:
Fred. G. Dieterich.
Jno. W. Stockett
INVENTOR.
Henry J. Campbell,
by C. A. Snow & Co.,
ATTORNEYS.

United States Patent Office.

HENRY J. CAMPBELL, OF ALTOONA, PENNSYLVANIA.

WINE AND CIDER PRESS.

SPECIFICATION forming part of Letters Patent No. 261,807, dated July 25, 1882.

Application filed June 21, 1882. (No model.)

*To all whom it may concern:*

Be it known that I, HENRY J. CAMPBELL, of Altoona, in the county of Blair and State of Pennsylvania, have invented certain new and useful Improvements in Wine and Cider Presses; and I do hereby declare that the following is a full, clear, and exact description of the invention, which will enable others skilled in the art to which it appertains to make and use the same, reference being had to the accompanying drawings, which form a part of this specification.

Figure 1 is a side view of my improved cider mill and press. Fig. 2 is a longitudinal vertical sectional view. Fig. 3 is a rear view, and Fig. 4 is a section on the line $x\ x$, Fig. 1.

Corresponding parts in the several figures are denoted by like letters of reference.

This invention relates to an improved cider mill and press combined, the construction of which will be hereinafter fully described, and particularly pointed out in the claims.

Referring to the drawings hereto annexed, A represents the frame of the machine, which is provided with a suitable hopper, B, into which the apples or other fruit may be fed. The lower rear edge of the hopper B is equipped with teeth or cutters C.

Mounted in suitable bearings below the hopper is a transverse shaft, D, carrying a cylinder, E, armed with knives F, meshing with the cutters C, so that when the cylinder revolves the fruits fed into the hopper will be crushed or desiccated.

In suitable bearings at the rear or tail end of the machine are journaled a pair of transverse rollers, G, coated or covered with india-rubber and arranged closely in contact with each other. The upper roller may be mounted in vertically-sliding boxes H, forced downwardly by springs I, the tension of which may be regulated in any suitable manner.

An inclined plane, J, constructed wholly or partly of wire-cloth or other straining material, leads from under the hopper B to the rollers G, to which the pomace is thus conducted. Under the inclined plane J, or as much of the same as is perforated, is arranged an inclined V-shaped trough, K, provided at one end with a straining-spout, L.

M is a scraper bearing against the lower roller for the purpose of removing therefrom any pomace which may adhere after being pressed.

N is a hinged cover arranged at the tail end of the machine, and bearing against the upper roller in the same manner and for the same purpose.

The rollers G G are provided at one end with cog-wheels O, meshing together for the purpose of revolving said rollers in opposite directions. Suitable mechanism is also provided for the purpose of operating the cylinder E and rollers G simultaneously.

The operation of my invention will be readily understood. As the pomace passes down the perforated inclined plane it is partly strained, and the remainder of the juice, which is pressed out by the rollers G, passes through the same straining medium into the trough K, which carries it off. The pomace from which the juice has been extracted passes out at the tail end of the machine between the rollers G.

I claim and desire to secure by Letters Patent of the United States—

1. The combination of the frame having a suitable hopper toothed at its lower edge, the cutting-cylinder, the inclined plane, wholly or partly perforated, the V-shaped trough having a straining-spout, the pressing-rollers, and suitable operating mechanism, as set forth.

2. The combination, with the pressing-rollers, arranged and operating as herein described, of a stationary scraper bearing against the lower roller and a hinged door bearing in like manner against the upper roller, and affording access to the interior of the machine, as set forth.

In testimony that I claim the foregoing as my own I have hereto affixed my signature in presence of two witnesses.

HENRY J. CAMPBELL.

Witnesses:
 WM. BAGGER,
 N. L. COLLAMER.